A. FULTON.
IGNITION TESTING APPARATUS.
APPLICATION FILED NOV. 26, 1915.
1,199,539.
Patented Sept. 26, 1916.
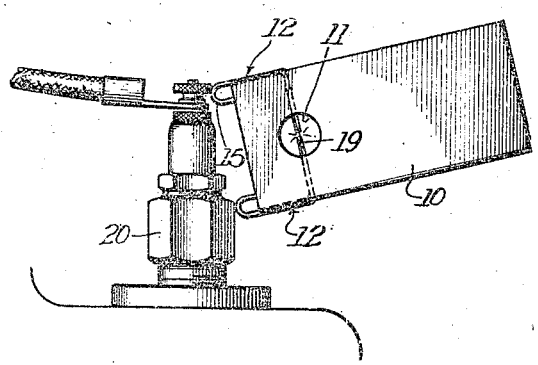
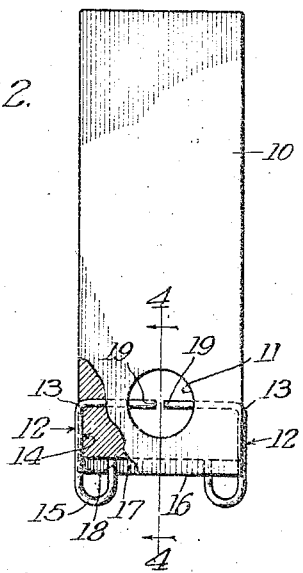
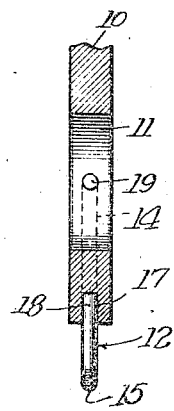
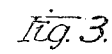
Witnesses:
Robert H. Weir
Arthur W. Carlson
Inventor
Ashley Fulton

UNITED STATES PATENT OFFICE.

ASHLEY FULTON, OF WESTERN SPRINGS, ILLINOIS.

IGNITION-TESTING APPARATUS.

1,199,539.   Specification of Letters Patent.   Patented Sept. 26, 1916.

Application filed November 26, 1915. Serial No. 63,362.

*To all whom it may concern:*

Be it known that I, ASHLEY FULTON, a citizen of the United States, residing at Western Springs, in the county of Cook and State of Illinois, have invented certain new and useful Improvements in Ignition-Testing Apparatus, of which the following is a specification.

My invention relates to improvements in ignition testing apparatus and more particularly to a device or instrument for testing and determining the conditions under which the spark plug of an internal combustion engine is operating.

The difficulty in properly diagnosing and locating the trouble underlying irregular firing of the cylinders in a gas engine is too well known to require lengthy explanation. It may be the result of any one of a large number of causes, such for example as, pitted valves, leaky piston rings, faulty valve or ignition timing, excessive carbon deposits in the cylinders, faulty carburetion, or faulty ignition. The last two troubles above enumerated are undoubtedly encountered more frequently than any of the others and it is the object of my invention to provide an instrument for testing the ignition of a gas engine while in operation. In modern ignition systems, the source of high tension current supply usually a magneto or transformer and distributer, has reached such a high development that it seldom is the source of trouble and faulty ignition of the gas charge is usually due to loose wiring connections, a breaking down of the insulation of the high tension current carrying wires, or a broken, sooted or otherwise defective spark plug.

The principal object of my invention is the provision of a simple, inexpensive and efficient instrument for locating the source of ignition trouble.

Another object of my invention is the provision of a small, flat instrument, such as may readily be carried in the vest pocket, and by means of which a spark-gap including shunt circuit may be readily placed across the terminals of a spark plug.

Still another object is the provision of such an instrument having a flat, comparatively thin body of insulating material serving as a handle and providing a wide flat surface upon which advertising matter may be placed.

Still another object of the invention is the provision of a spark-gap in which the terminal wires are fastened within the body of insulating material without extraneous connection and may be readily adjusted to vary the distance over which the high tension current is required to jump.

In the drawings wherein I have illustrated a preferred embodiment of my invention: Figure 1 is a side elevation of my instrument showing it as applied to the terminals of a spark plug. Fig. 2 is a plan view with parts broken away. Fig. 3 is a perspective view, and Fig. 4 is a fragmentary section on the line 4—4 of Fig. 2.

Referring to the drawings the numeral 10 indicates a flat, relatively thin, long and generally rectangular body member formed of a suitable insulating material, such as wood, fiber or bakelite. Near one end of the body member I have provided a through circular aperture 11 into which project from opposite sides the two metal wires indicated in general by the numeral 12—12. These wires extend radially through opposite edges of the body member and are bent at right angles at point 13 to lie within the grooves 14 and project beyond the end of the body member, as at 15.

The end edge 16 adjacent the aperture 11 is slotted, as at 17, to receive the extreme ends 18 of the wires 12 which are bent back upon themselves beyond the points 15. The ends 19—19 of the wires which project within the aperture 11 are spaced apart a short distance to provide a spark-gap, the length of which may be readily varied by slipping either one or the other of the wires 12 outwardly from the position in which the sides lie within the grooves 14. The slotted end edge in which the extreme ends of the wires 18 are positioned insures the terminals at all times lying in the same plane and at the same time permit the adjustment of either wire to vary the spark-gap.

The body member 10 is made long and flat, to not only provide a handle by means of which the instrument is bridged across the terminals of the spark plug 20, as illustrated in Fig. 1, but also to provide a flat surface upon which advertising matter may be placed.

Having described my invention what I claim is:

1. A spark plug testing device comprising a flat, relatively thin, substantially rectangular body member of insulating material having a through aperture near one end, a pair of metallic wires extending through said member from opposite sides into the aperture with their ends spaced apart to provide a spark gap, their outer ends being turned at right angles to lie against the sides of the body member and project beyond the adjacent end to provide spark plug engaging terminals.

2. A spark plug testing device comprising a flat, relatively thin, long body member of insulating material having a through aperture near one end thereof, the adjacent end edge having a slot formed therein communicating at its ends with grooves formed in the opposite edges of the member and extending from the ends to points opposite the aperture, and two metallic wires each having an end projecting through the member from the inner ends of the grooves into said aperture with their ends spaced apart to form a spark-gap, the outer portions of said wires being bent at right angles to lie within said grooves and project beyond the end of the member, their end portions being doubled back to form spark plug engaging terminals with the ends lying within the end slot.

In testimony whereof I hereunto set my hand in the presence of two subscribing witnesses.

ASHLEY FULTON.

In the presence of—
  STANLEY W. COOK,
  MARY F. ALLEN.